US010952000B1

United States Patent
Dabi et al.

(10) Patent No.: US 10,952,000 B1
(45) Date of Patent: Mar. 16, 2021

(54) METHOD AND APPARATUS FOR BALANCED AUDIO DETECTION AND CONVERSION

(71) Applicant: SLING MEDIA PVT LTD, Bangaluru (IN)

(72) Inventors: Nishit Dabi, Madhya Pradesh (IN); Abhiroop Boggavarapu, Bangalore (IN); Deepak Poongundran, Tamil Nadu (IN); Narayana Rao, Bangalore (IN)

(73) Assignee: SLING MEDIA PVT LTD, Bangaluru (IN)

(*) Notice: Subject to any disclaimer, the term of this patent is extended or adjusted under 35 U.S.C. 154(b) by 0 days.

(21) Appl. No.: 16/676,685

(22) Filed: Nov. 7, 2019

(51) Int. Cl.
| | | |
|---|---|---|
| *H04R 29/00* | (2006.01) | |
| *H04S 1/00* | (2006.01) | |
| *G06F 7/552* | (2006.01) | |
| *H04R 5/04* | (2006.01) | |
| *H04S 7/00* | (2006.01) | |
| *G10L 19/008* | (2013.01) | |

(52) U.S. Cl.
CPC .......... *H04R 29/00* (2013.01); *G06F 7/552* (2013.01); *H04R 5/04* (2013.01); *H04S 1/007* (2013.01); *G10L 19/008* (2013.01); *H04R 2420/09* (2013.01); *H04S 7/30* (2013.01)

(58) Field of Classification Search
CPC . H04S 7/30; H04S 1/007; G06F 7/552; G10L 19/008; H04R 5/04; H04R 2420/09; H04R 29/00
See application file for complete search history.

(56) References Cited

U.S. PATENT DOCUMENTS

| | | | | |
|---|---|---|---|---|
| 6,744,276 B1* | 6/2004 | Hauke | ..................... | H04S 1/007 326/30 |
| 8,338,689 B1* | 12/2012 | Beaty | ................... | G10H 1/0091 84/746 |
| 2017/0026745 A1* | 1/2017 | Chun | ................... | H04R 29/001 |

FOREIGN PATENT DOCUMENTS

CN             105721980 A  *   6/2016

OTHER PUBLICATIONS

Google Patents, "CN 105721980 A Audio differential signal implementation method", Jun. 29, 2016, Google, "https://patents.google.com/patent/CN105721980A/en?oq=CN+105721980+A". pp. 1-5. (Year: 2016).*

\* cited by examiner

*Primary Examiner* — Davetta W Goins
*Assistant Examiner* — Daniel R Sellers
(74) *Attorney, Agent, or Firm* — Lorenz & Kopf LLP

(57) ABSTRACT

Systems and processes are provided to detect an balanced audio signal and generation of an unbalanced audio signal including a first audio input for receiving a first audio signal, a second audio input for receiving a second audio signal, a processor for determining a first root mean square value for the first audio signal, a second root mean square value for the second audio signal and a combined root mean square value for a sum of the first audio signal and the second audio signal, the processor being further operative to generate an unbalanced audio signal in response to the first root mean square value exceeding a first threshold value, the second root mean square value exceeding the first threshold value and the combined root mean square value being less than a second threshold value, and an audio decoder operative to decode the unbalanced audio signal.

20 Claims, 5 Drawing Sheets

METHOD AND APPARATUS FOR BALANCED AUDIO DETECTION AND CONVERSION

TECHNICAL FIELD

The following discussion generally relates to the reception and processing of audio signals in an electronic device. More particularly, the following discussion relates to determining reception of a balanced audio signal at an unbalanced audio input and conversion of the balanced audio to unbalanced audio.

BACKGROUND

Many electronic devices are equipped with audio inputs to electrically receive audio signals from a microphone, digital audio source or other connected audio source. Audio signal may be received from a connected audio source via a cable including a number of electrical conductors ending in a connector which may be inserted into an audio input or audio jack on the electronic device. The connector may be a standard connector, such as a ¼ inch tip ring sleeve (TRS) audio connector, ⅛ inch TRS, 3 pin XLR, RCA, and universal serial bus (USB) among others.

While the audio connector size may be standard, the audio signal conducted over the cable may be one of many different formats, such as analog or digital, balanced audio, unbalanced audio, mic level, instrument level, line level, mono, stereo, etc. One particular problematic situation is the use of balanced mono and unbalanced stereo audio signals. The TRS connectors found on audio cables may conduct both unbalanced stereo and balanced mono audio using the same two conductor twisted pair shielded cable configuration. In balanced mono, one of the two twisted pair conductors transmits an in phase version of the audio signal and the second conductor transmits an out of phase version of the same audio signal. This facilitates the receiving device to invert the phase of the out of phase audio signal, thereby also inverting the phase of any noise that was received by that conductor, and then combining the in-phase audio and the flipped out of phase audio to cancel any noise received in the two conductors. However, an unbalanced stereo receiver may receive a balanced audio signal, not flip the out of phase audio signal and thereby process the balanced audio signal as an unbalanced stereo signal and couple inverted mono versions of the audio signal to the playback device and providing an incorrect audio playback experience to a listener. It is therefore desirable to create systems and methods that are able to determine audio formats to avoid these problems. Other desirable features and characteristics will become apparent from the subsequent detailed description and the appended claims, taken in conjunction with the accompanying drawings and this background section.

BRIEF SUMMARY

Disclosed herein are human machine interface methods and systems and related circuitry for provisioning computational systems, methods for making and methods for operating such systems, and system equipped with onboard control systems. By way of example, and not limitation, presented are various embodiments of detection of audio signal formats and correction methods are disclosed herein.

In accordance with an aspect of the disclosure a method including receiving a first audio signal and a second audio signal at a first audio input, adding the first audio signal and the second audio signal to generate a combined audio signal, calculating a first root mean square value for the first audio signal and a second root mean square value for the second audio signal and a combined root mean square value for the combined audio signal, determining the first audio signal and the second audio signal form a balanced audio signal in response to the first root mean square value exceeding a first threshold value, the second root mean square value exceeding the first threshold value and the combined root mean square being less than a second threshold value, and generating an unbalanced audio signal in response to the first audio signal and the second audio signal in response to the determination that the first audio signal and the second audio signal form a balanced audio signal.

In accordance with another aspect of the disclosure wherein the first threshold is 300.

In accordance with another aspect of the disclosure wherein the second threshold is 10% of the first root means square value.

In accordance with another aspect of the disclosure wherein the unbalanced audio signal is a monaural audio signal.

In accordance with another aspect of the disclosure wherein the unbalanced audio signal is the first audio signal.

In accordance with another aspect of the disclosure wherein the unbalanced audio signal is a combination of the first audio signal and an inversed polarity second audio signal.

In accordance with another aspect of the disclosure wherein the first audio signal and the second audio signal are received via an inter IC sound interface.

In accordance with another aspect of the disclosure wherein the first audio signal and the second audio signal are pulse width modulated signals.

In accordance with another aspect of the disclosure an apparatus including a first audio input for receiving a first audio signal, a second audio input for receiving a second audio signal, a processor for determining a first root mean square value for the first audio signal, a second root mean square value for the second audio signal and a combined root mean square value for a sum of the first audio signal and the second audio signal, the processor being further operative to generate an unbalanced audio signal in response to the first root mean square value exceeding a first threshold value, the second root mean square value exceeding the first threshold value and the combined root mean square value being less than a second threshold value, and an audio decoder operative to decode the unbalanced audio signal.

In accordance with another aspect of the disclosure wherein the unbalanced audio signal is generated in response to the first audio signal.

In accordance with another aspect of the disclosure wherein the unbalanced audio signal is generated from the first audio signal and an inversion of the second audio signal.

In accordance with another aspect of the disclosure wherein the unbalanced audio signal having a first channel and a second channel and wherein the unbalanced audio signal is generated by coupling the first audio signal to the first channel and the second channel.

In accordance with another aspect of the disclosure wherein the first audio signal and the second audio signal form a balanced monaural audio signal.

In accordance with another aspect of the disclosure wherein the first audio signal and the second audio signal form a two-channel audio signal.

In accordance with another aspect of the disclosure wherein the audio decoder is a pulse code modulated decoder.

In accordance with another aspect of the disclosure wherein the first audio input is an inter IC sound interface.

In accordance with another aspect of the disclosure wherein the second threshold value is 10% of the first threshold value.

In accordance with another aspect of the disclosure wherein the second threshold value is 10% of a peak value of the first root mean square value.

In accordance with another aspect of the disclosure, an apparatus for decoding an audio signal including a digital audio input for receiving a digital audio signal, a decoder for generating a pulse code modulated audio signal having a first channel signal and a second channel signal, a detector to calculate a first root mean square value for the first channel signal, a second root mean square value for the second channel signal and a combined root mean square value for a sum of the first channel signal and the second channel signal, a processor to generate an unbalanced audio signal including the first channel signal in response to the first root mean square value exceeding a first threshold, the second root mean square value exceeding the first threshold and the combined root mean square value being less than a second threshold, and an audio encoder operative to generate an encoded audio signal in response to the unbalanced audio signal.

In accordance with another aspect of the disclosure wherein the second threshold value is 10% of the first threshold value.

The above advantage and other advantages and features of the present disclosure will be apparent from the following detailed description of the preferred embodiments when taken in connection with the accompanying drawings.

BRIEF DESCRIPTION OF THE DRAWING FIGURES

The exemplary embodiments will hereinafter be described in conjunction with the following drawing figures, wherein like numerals denote like elements, and wherein.

The exemplifications set out herein illustrate preferred embodiments of the disclosure, and such exemplifications are not to be construed as limiting the scope of the disclosure in any manner.

DETAILED DESCRIPTION

The following detailed description is intended to provide various examples, but it is not intended to limit the disclosure or the application and uses of the disclosure. Furthermore, there is no intention to be bound by any theory presented in the preceding background or the following detailed description.

The general concepts described herein may be implemented in any electronic device with an audio input. For convenience of illustration, the following discussion often refers to an audio signal processing device operative to receive audio from an audio producing device, such as a microphone or digital audio source via an audio cable, and to convert a format of the audio useful for an audio processor or the like. The actions taken in response to the detection of a balanced audio signal can be associated with the functionality of the mobile phones, portable electronic entertainment devices, and any other electronic media device. Additional details and examples are provided in the following description.

Figure 1A:
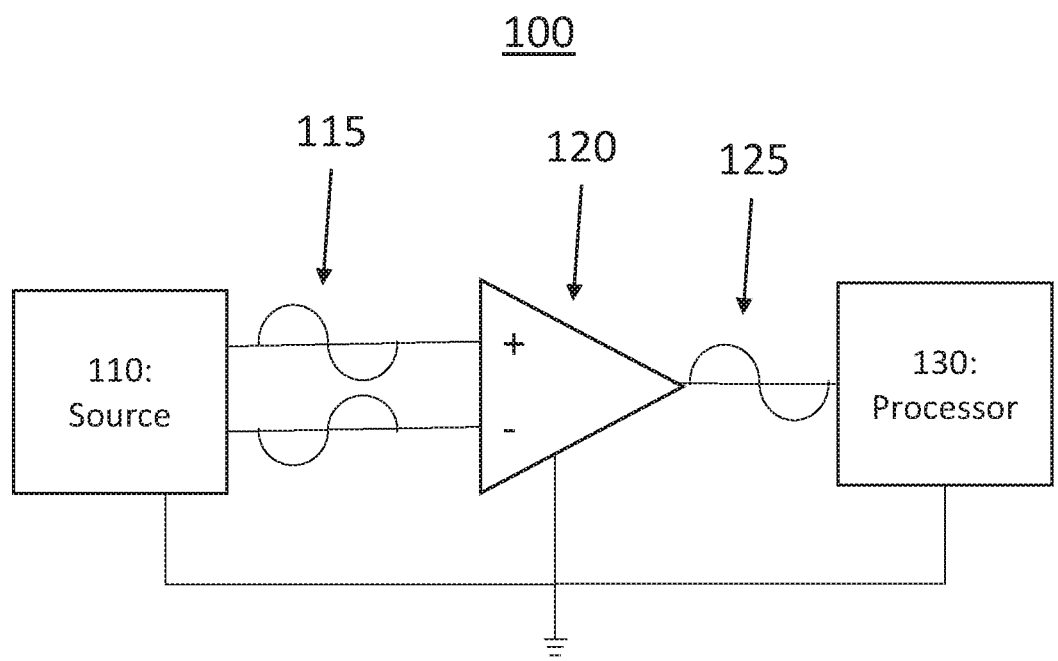
FIG. 1a shows an application for balanced audio detection and conversion in an electronic device according to an exemplary embodiment of the present disclosure.

Turning now to FIG. 1a, an environment for a system 100 for transmission of a balanced audio signal in an electronic device according to an exemplary embodiment of the present disclosure is shown. The exemplary system 100 may include a balanced audio source 110, an amplifier 120, such as a differential amplifier and an audio processor 130. In this exemplary environment, the balanced audio source 110 is operative to transmit a balanced audio signal 115 to the amplifier 120. The balanced audio signal 115 is typically transmitted on an audio cable between the balanced audio source 110 and the amplifier 120. The amplifier 120, typically located within the destination electronic device, is then operative to amplify the received audio signal to generate a monaural, or mono, signal to couple to the audio processor 130.

In one embodiment of the exemplary environment 100, the balanced audio signal 115 is transmitted by the balanced audio source 110 on a twisted pair set of conductors within a shielded cable. The exemplary system uses differential signaling where a first conductor of the twisted pair is operative to conduct a signal with an unaltered polarity and the second conductor is operative to conduct an inverted polarity version of the same signal. Noise that couples equally to the two conductors will be rejected by a differential amplifier 120.

Figure 1B:
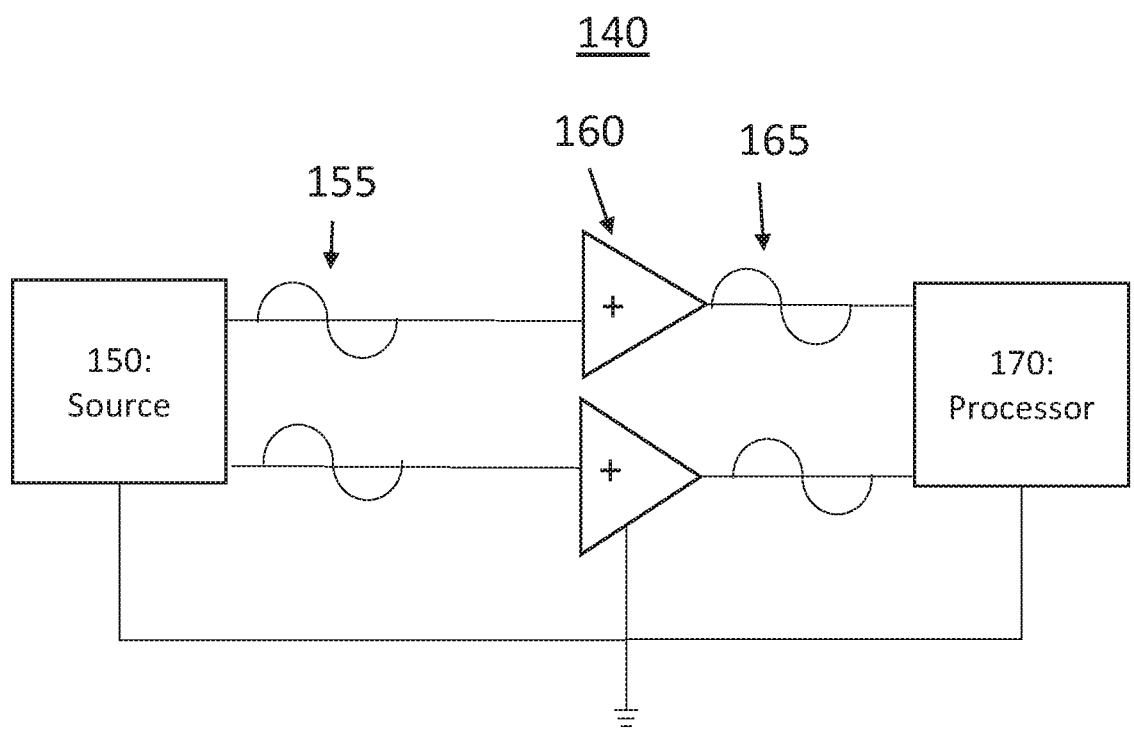
FIG. 1b shows another application for audio detection and conversion in an electronic device according to an exemplary embodiment of the present disclosure.

Turning now to FIG. 1b, another environment for a system 100 for audio detection and conversion in an electronic device according to an exemplary embodiment of the present disclosure is shown. This exemplary system 140 may include an unbalanced stereo audio source 150, a pair of amplifiers 160 and an audio processor 170. In this exemplary embodiment, unbalanced stereo audio source 150 is operative to transmit a stereo audio signal 155, having an independent left channel and an independent right channel, on a twisted pair shielded cable to the pair of amplifiers 160. The amplifiers 160 are each operative to amplify one of the audio channels and to couple these amplified audio channels to the audio processor 170 in parallel.

In the exemplary environment of FIG. 1b of the signal conducted by the source was a balanced audio signal, the unaltered polarity signal would be amplified by one of the amplifiers 160 and the inverted polarity signal would be amplified by the other amplifier and the unaltered and inverted polarity signals would not be combined, but would be coupled to the audio processor 170 as left and right audio channels for further processing. Thus, undesirably, when coupled to a set of stereo speakers, a mono version and an inverted mono version of the same audio signal would be played.

Figure 2:
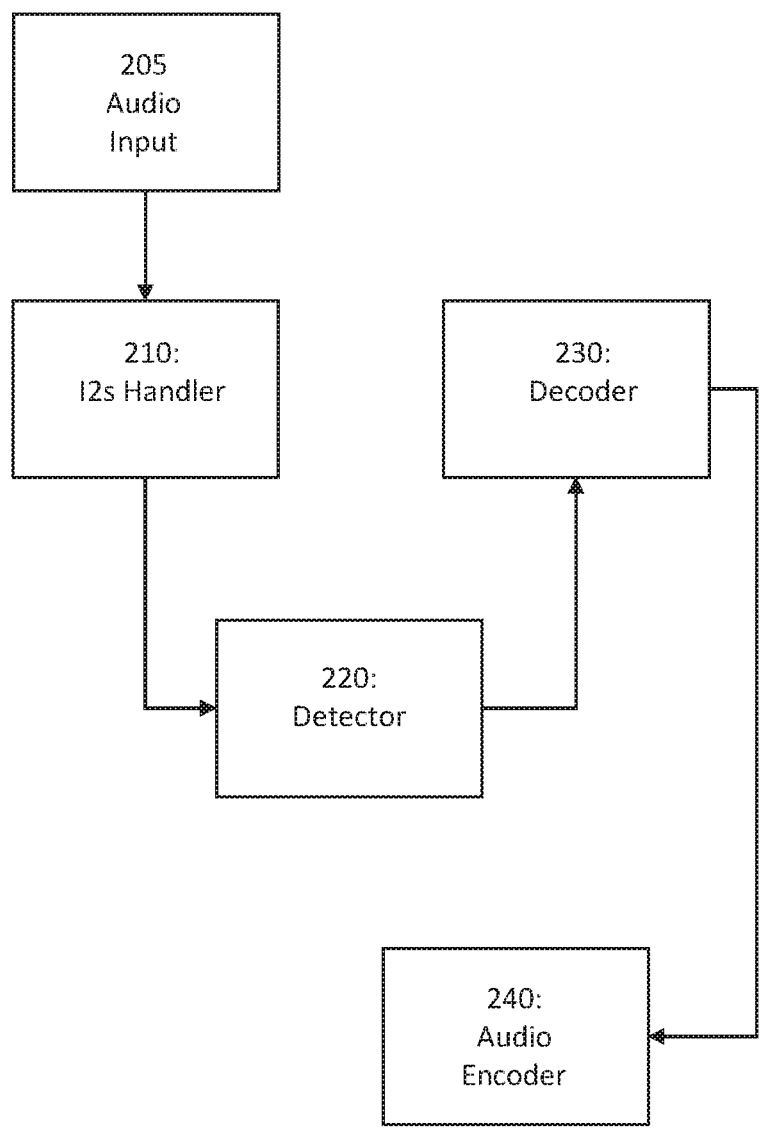
FIG. 2 shows a system for balanced audio detection and conversion in an electronic device according to an exemplary embodiment of the present disclosure.

Turning now to FIG. 2, a system 200 for balanced audio detection and conversion in an electronic device according to an exemplary embodiment of the present disclosure is shown. The system 200 may include an audio input 205, an I2s handler 210, a balanced audio detector 220, a decoder 230, and an audio encoder 240. In this exemplary embodiment, the system 200 is configured to receive an unbalanced two channel audio signal and to detect for the presence of a monaural balanced audio signal. The audio input 205 is operative to receive a two-channel audio signal via an audio cable, to initially process the two-channel audio signal and to couple the two channel audio signal to the I2s handler 210.

In a first exemplary embodiment, the two-channel audio signal may be an Inter-IC Sound (I2s) digital audio signal. The Its signal may then be coupled to an Its handler 210 for processing. The I2s handler 210 may be operative to generate a pair of pulse code modulated (PCM) output signals. The I2s handler 210 may alternatively be operative to convert the digital audio signal to a pair of analog output signals wherein each of the analog output signals correspond to a different channel of the two channel audio signal. The pair of output signals is then coupled to the balanced audio detector 220.

The balanced audio detector 220 is operative to receive the pair of audio signals from the I2S handler 210 and to determine if the audio signals are a balanced monaural audio signal or an unbalanced stereo audio signal. In an exemplary embodiment, the detector 220 may first be operative to calculate a root mean square (RMS) value for each of the pair of output signals. The detector 220 is then operative to combine the RMS values for both audio signals. The detector 220 then compares the combined RMS to a threshold value. For example, if the RMS is greater than 300 for 16-bit signed integer representation of PCM audio signal and the combined RMS is less than 10% of the individual RMS values for each of the audio signals, the detector 220 may determine that the audio signals are a balanced monaural audio signal. If the audio signals are a balanced monaural audio signal, the detector 220 may then be operative to correct the balanced monaural audio signal to an unbalanced monaural audio signal on one or more of the audio signals.

In one exemplary embodiment, in response to the detection of a balanced monaural signal, the detector 220 may couple one of the pair of output signals to both of the detector outputs, thereby providing the same non-inverted monaural audio signal to each of the two channel detector outputs. Alternatively, the detector 220 may be operative to provide only one of the pair of audio signals to one of the detector outputs, thereby providing a single channel monaural output. The detector 220 may be operative to invert one of the pair of output signals and to provide the one of the pair of output signal to one detector output and an inverted version of the other output audio signal to the second detector output thereby providing two signals with the same final polarity to the detector output. Thus, in response to the determination of a balanced input signal, the detector 220 is operative to output either a one channel or two channel monoaural signal to the decoder 230. If the input signal is an unbalanced two channel signal, the audio is coupled to the decoder 230 in the unmodified format of the pair of audio signals received from the I2s input 210.

The decoder 230 is operative to receive the audio signals from the detector 220 and is operative for converting the audio signals from a first format, such as PCM to a second format, such as analog audio, to generate a decoded signal. In some exemplary embodiments, the audio may be then coupled to an audio encoder 240 for encoding into a different audio format, such as Advanced Audio Coding (AAC) for storage or transmission via a wireless network or the like.

Figure 3:
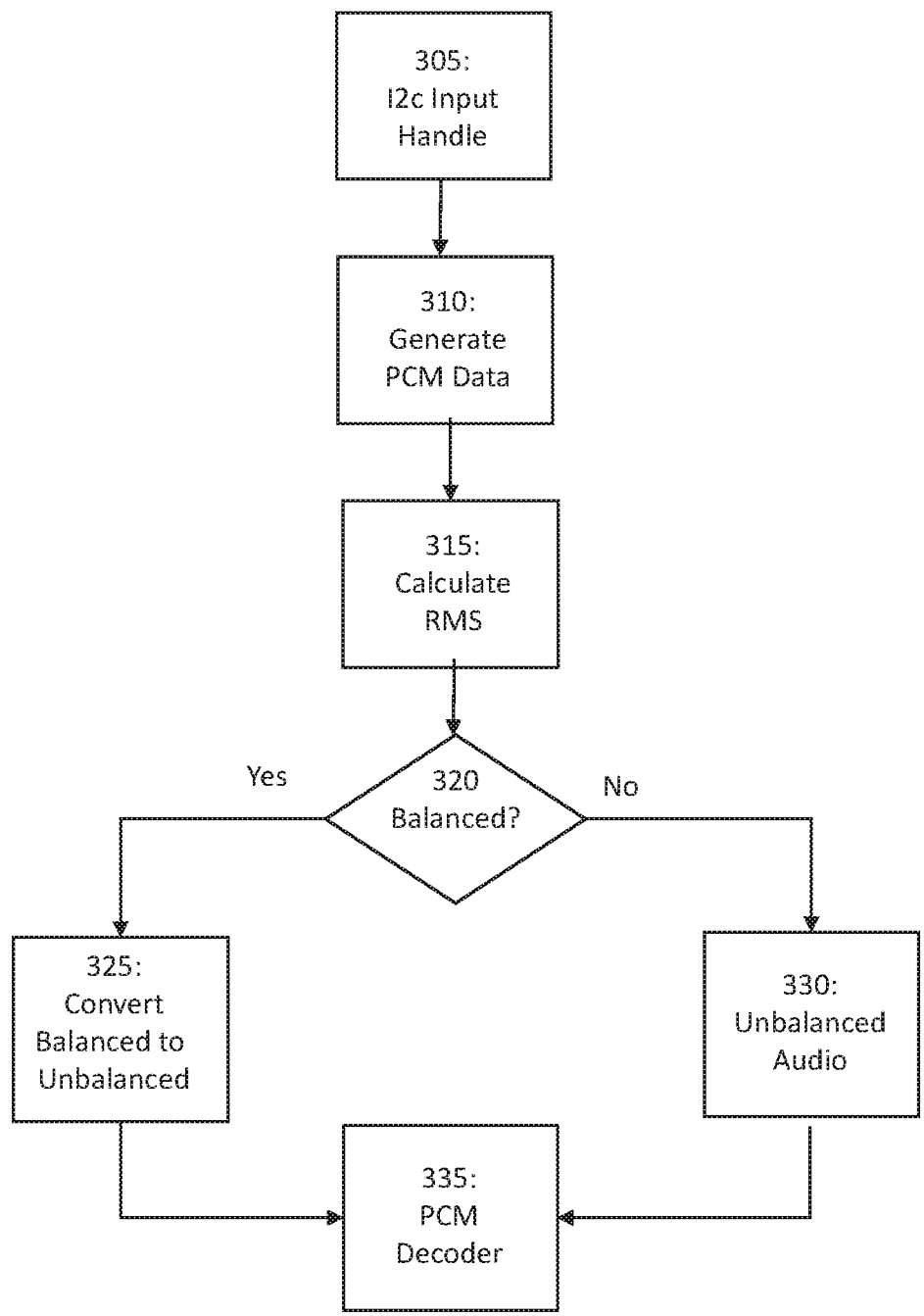
FIG. 3 shows a method for balanced audio detection and conversion in an electronic device according to an exemplary embodiment of the present disclosure.

Turning now to FIG. 3, a method 30o for balanced audio detection and conversion in an electronic device is shown. The method is first operative to receive a two-channel audio signal. The two-channel audio signal may be an analog two channel stereo signal having a left channel on one conductor and a right channel on a second conductor or a balanced signal with an audio signal on the first conductor and an inverted, or reverse polarity version, of the audio signal on the second conductor. In this exemplary embodiment, the method is operative to receive 305 an Its digital audio signal. An Its input handler is operative to receive the audio signal and extract 310 a PCM audio signal in response to the Its audio signal.

The method is next operative to calculate an RMS value for each of the two channels of the PCM audio signal. The RMS value is the average value of the waveform compared to the peak value. The RMS value for a sine wave is 0.707. The method is next operative to compare the individual RMS values and the combined RMS to the individual RMS values. For example, if the combined RMS of the right and left channels in a 16-bit signed integer representation of PCM audio samples are less than 10% of each of the individual RMS values, and each of the RMS values for the individual channels is greater than 300, then the audio signal is likely a balanced audio signal. If a balanced audio signal is determined 320 the method is next operative to convert 325 the balanced audio signal to an unbalanced audio signal. If an unbalanced audio signal is determined, the PCM audio signal is then coupled to a PCM decoder for decoding 335 of the PCM audio signal to an analog audio signal.

The method may convert 325 the balanced audio signal to an unbalanced audio signal by coupling one channel of the PCM audio signal to both channel outputs of the balanced signal detector, may invert one of the channels, or may only couple one of the channels to the output of the detector to generate a single channel monaural audio signal for example. The converted audio signal is then coupled to a PCM decoder for decoding 335 of the PCM audio signal to an analog audio signal.

Figure 4:
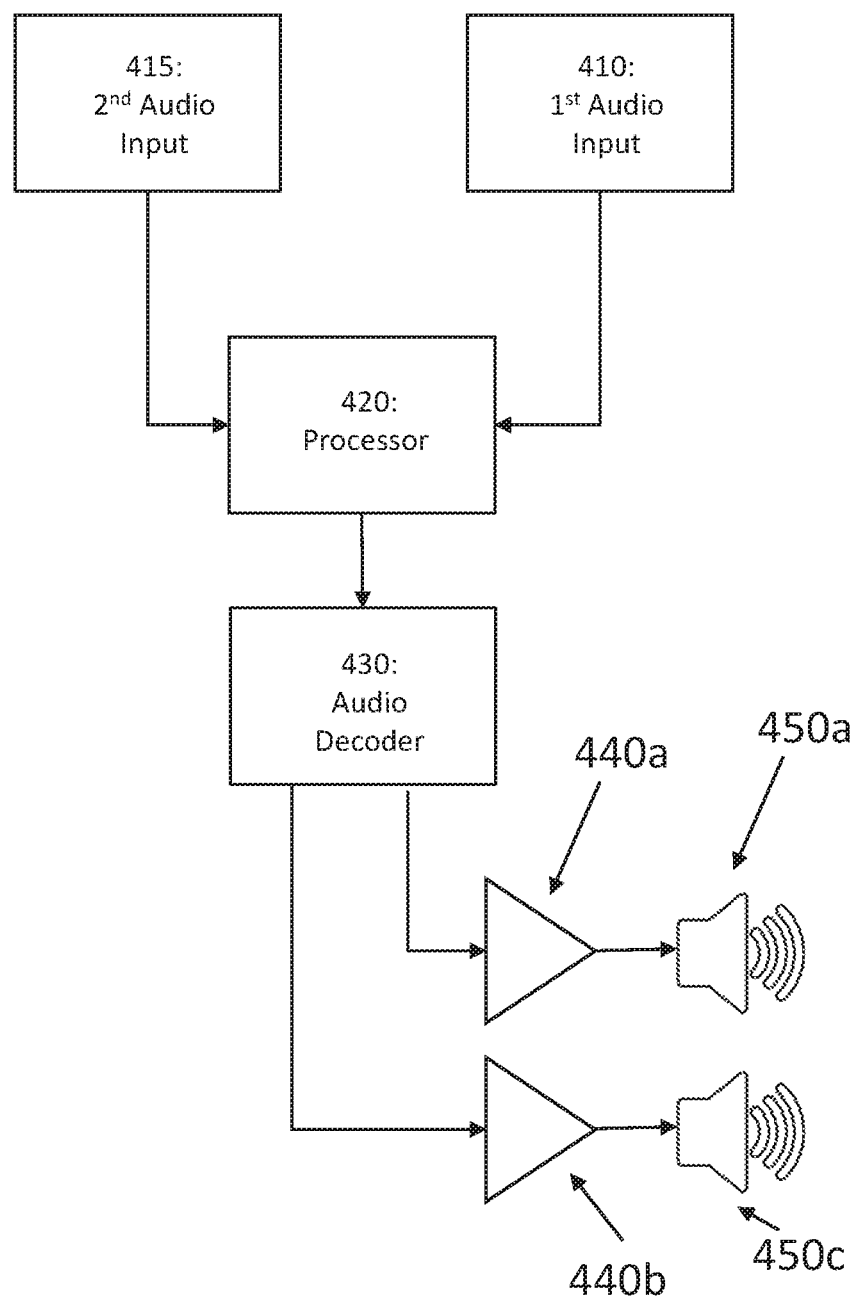
FIG. 4 shows another system for balanced audio detection and conversion in an electronic device according to another exemplary embodiment of the present disclosure.

Turning now to FIG. 4, another system 400 for detection of an improper external power supply according to an exemplary embodiment of the present disclosure is shown. In this exemplary embodiment, the system 400 may include a first audio input 410, a second audio input 415, a processor 420, and an audio decoder 430.

The first audio input 410 and the second audio input 415 are operative to receive a first audio signal and a second audio signal respectively. The first audio signal and the second audio signal may form an unbalanced stereo audio signal. Alternatively, the first audio signal and the second audio signal may form a balanced monaural audio signal. The first audio input 410 and the second audio input 415 may be received part of an Its signal interface or Its signal handler. The first audio signal and the second audio signal are then coupled to a processor 420.

The processor 420 is operative for determining a format of the first audio signal and the second audio signal. For example, the processor 420 may first be operative to determine if the first audio signal and the second audio signal form an unbalanced signal or a balanced signal. The processor 420 is first operative to determine a first root mean square value for the first audio signal and a second root mean square value for the second audio signal. The processor 420 is further operative to generate a combined root mean square value for a sum of the first audio signal and the second audio signal. Theoretically, a balanced signal includes a first signal and an inverse polarity version of the same signal. Thus, the RMS value of the combined balanced signal should be zero. The RMS may raise above zero in the presence of noise in the first or second audio signals and any phase shift between the two signals. In this exemplary embodiment, if the first RMS value is greater than a predetermined threshold, indicating that a signal is present at the first audio input, and the second RMS value is also greater than the predetermined threshold, indicating that a signal is present at the second audio input, the processor may then compare the combined RMS value to the second, lower threshold to determine if the pair of signals form a balanced signal or an unbalanced signal. If the combined RMS value is very low, such as approaching zero, the processor 420 may determine that the pair of signals form a balanced signal. If the combined RMS value is higher than the threshold, the processor 420 may determine that the pair of signals form an unbalanced signal, such as a stereo audio signal.

In response to the determination of the first audio signal and the second audio signal forming a balanced audio signal, the processor 420 is next operative to generate an unbalanced audio signal in response to the balanced signal. The processor 420 may generate the unbalanced audio signal by inverting the second audio signal and coupling the first audio signal and the inverted second audio signal to the audio decoder 430. Alternatively, the processor 420 may couple only one of the audio signals, such as the first audio signal to one or two inputs of the audio decoder 430. In one exemplary embodiment, the processor 420 is operative to generate a one channel or two channel unbalanced monaural audio signal in response to the balanced audio signal The audio decoder 430 operative to decode the unbalanced audio signal to generate a decoded audio signal or the like. For example, the audio decoder 430 may be a pulse code modulated decoder and the first audio signal and the second audio signal may be pulse code modulated. The audio decoder 430 is operative to decoder the pulse code modulated audio signals to generate a left and right channel unbalanced audio signal. The decoded unbalanced audio signal may be a baseband audio signal suitable for coupling to amplifiers 440a, 440b and speakers 450a, 450b or may be reencoded for transmission via a wireless network, such as the internet. For example the decoded audio signal may be reencoded using AAC and then transmitted via transmission control protocol/Internet protocol via the internet to a remote server or the like.

In another exemplary embodiment, the exemplary system for decoding an audio signal may include a digital audio input for receiving a digital audio signal via a network connection or other digital audio source. The digital audio signal may be received via a cable or a wireless transmission means. The system may further include a decoder for generating a pulse code modulated audio signal having a first channel signal and a second channel signal. A detector may then be used to calculate a first root mean square value for the first channel signal, a second root mean square value for the second channel signal and a combined root mean square value for a sum of the first channel signal and the second channel signal. These RMS values are used to determine if the signal is an unbalanced audio signal or a balanced audio signal. If the signal is an unbalanced audio signa, a processor may be used to generate an unbalanced audio signal including the first channel signal in response to the first root mean square value exceeding a first threshold, the second root mean square value exceeding the first threshold and the combined root mean square value being less than a second threshold. The unbalanced audio signal may then be coupled to an audio decoder operative to generate a decoded audio signal in response to the unbalanced audio signal.

Figure 5:
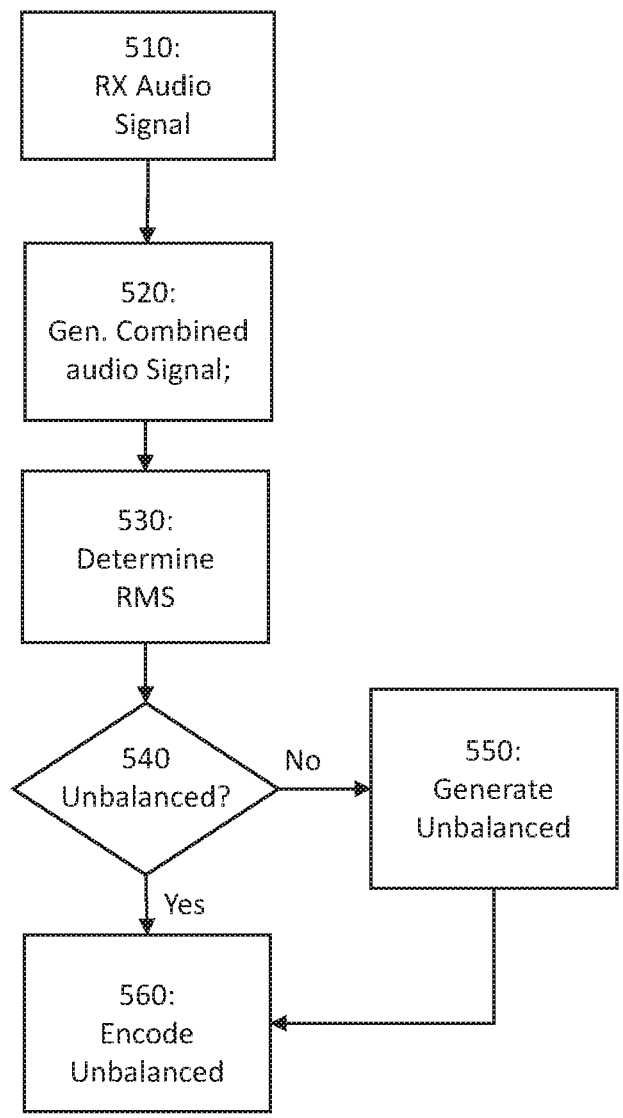
FIG. 5 shows another method for balanced audio detection and conversion in an electronic device according to another exemplary embodiment of the present disclosure.

Turning now to FIG. 5, another method 500 for detection of an improper external power supply according to an exemplary embodiment of the present disclosure is shown. The method is first operative to receive 510 a first audio signal and a second Audio signal at a first audio input, such as an Its input, a ¼ cable input, or the like. In one exemplary embodiment, the first audio signal and the second audio signal are pulse width modulated signals.

The method is next operative to sum 520, or add, the first audio signal and the second audio signal to generate a combined audio signal. The audio signals may be summed using an audio mixer, summed digitally using a digital signal processor a summing amplifier, or the like.

The method is next operative for calculating 530 a first root mean square value for the first audio signal, a second root mean square value for the second audio signal, and a combined root mean square value for the combined audio signal. The method then compares 540 the first root mean square value to a first threshold value, the second root mean square value to the first threshold value to determine if each exceeds the first threshold value. If both signals exceed the first threshold value, the method then compares the combined root mean square being less to a second threshold value. In one exemplary embodiment, the second threshold value may be 10% of the first root means square value or 10% of the first threshold value.

If the combined root mean square is less than the second threshold value the method is next operative for generating 550 an unbalanced audio signal in response to the first audio signal and the second audio signal in response to the determination that the first audio signal and the second audio signal form a balanced audio signal. In an exemplary embodiment, the unbalanced audio signal may be a monaural audio signal. In another exemplary embodiment the unbalanced audio signal may be the first audio signal. In another exemplary embodiment the unbalanced audio signal may be a combination of the first audio signal and an inversed polarity second audio signal. The method is may then be operative to encode 560 the unbalanced signal or couple the unbalanced signal to one or more speakers for sound production to a listener.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the disclosure in any way. To the contrary, various changes may be made in the function and arrangement of the various features described herein without departing from the scope of the claims and their legal equivalents.

The invention claimed is:
1. A method comprising:
receiving a first audio signal and a second audio signal at a first audio input;
adding the first audio signal and the second audio signal to generate a combined audio signal;

calculating a first root mean square value for the first audio signal and a second root mean square value for the second audio signal and a combined root mean square value for the combined audio signal;

determining the first audio signal and the second audio signal form a balanced audio signal in response to the first root mean square value exceeding a first threshold value, the second root mean square value exceeding the first threshold value and the combined root mean square being less than a second threshold value; and generating an unbalanced audio signal in response to the first audio signal and the second audio signal in response to the determination that the first audio signal and the second audio signal form a balanced audio signal.

2. The method of claim 1 where the first threshold is 300 for 16-bit signed integer representation of PCM audio signal.

3. The method of claim 1 wherein the second threshold is 10% of the first root means square value.

4. The method of claim 1 wherein the unbalanced audio signal is a monaural audio signal.

5. The method of claim 1 wherein the unbalanced audio signal is the first audio signal.

6. The method of claim 1 wherein the unbalanced audio signal is a combination of the first audio signal and an inversed polarity second audio signal.

7. The method of claim 1 wherein the first audio signal and the second audio signal are received via an inter IC sound interface.

8. The method of claim 1 further wherein the first audio signal and the second audio signal are pulse width modulated signals.

9. An apparatus comprising:
a first audio input for receiving a first audio signal;
a second audio input for receiving a second audio signal;
a processor for determining a first root mean square value for the first audio signal, a second root mean square value for the second audio signal and a combined root mean square value for a sum of the first audio signal and the second audio signal, the processor being further operative to generate an unbalanced audio signal in response to the first root mean square value exceeding a first threshold value, the second root mean square value exceeding the first threshold value and the combined root mean square value being less than a second threshold value; and
an audio decoder operative to decode the unbalanced audio signal.

10. The apparatus of claim 9 wherein the unbalanced audio signal is generated in response to the first audio signal.

11. The apparatus of claim 9 wherein the unbalanced audio signal is generated from the first audio signal and an inversion of the second audio signal.

12. The apparatus of claim 9 wherein the unbalanced audio signal having a first channel and a second channel and wherein the unbalanced audio signal is generated by coupling the first audio signal to the first channel and the second channel.

13. The apparatus of claim 9 wherein the first audio signal and the second audio signal form a balanced monaural audio signal.

14. The apparatus of claim 9 wherein the first audio signal and the second audio signal form a two-channel audio signal.

15. The apparatus of claim 9 wherein the audio decoder is a pulse code modulated decoder.

16. The apparatus of claim 9 wherein the first audio input is an inter IC sound interface.

17. The apparatus of claim 9 wherein the second threshold value is 10% of the first threshold value.

18. The apparatus of claim 9 wherein the second threshold value is 10% of a peak value of the first root mean square value.

19. An apparatus for decoding an audio signal comprising:
a digital audio input for receiving a digital audio signal;
a decoder for generating a pulse code modulated audio signal having a first channel signal and a second channel signal;
a detector to calculate a first root mean square value for the first channel signal, a second root mean square value for the second channel signal and a combined root mean square value for a sum of the first channel signal and the second channel signal;
a processor to generate an unbalanced audio signal including the first channel signal in response to the first root mean square value exceeding a first threshold, the second root mean square value exceeding the first threshold and the combined root mean square value being less than a second threshold; and
an audio decoder operative to generate a decoded audio signal in response to the unbalanced audio signal.

20. The apparatus for decoding an audio signal of claim 19 wherein the second threshold value is 10% of the first threshold value.

* * * * *